(12) United States Patent
Delfyett et al.

(10) Patent No.: US 7,697,579 B1
(45) Date of Patent: Apr. 13, 2010

(54) OPTICAL FREQUENCY SELF STABILIZATION IN A COUPLED OPTOELECTRONIC OSCILLATOR

(75) Inventors: Peter J. Delfyett, Orlando, FL (US); Franklyn Quinlan, Orlando, FL (US); Sangyoun Gee, Orlando, FL (US); Sarper Ozharar, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 96 days.

(21) Appl. No.: 11/954,897

(22) Filed: Dec. 12, 2007

Related U.S. Application Data

(60) Provisional application No. 60/900,533, filed on Feb. 9, 2007.

(51) Int. Cl.
*H01S 3/13* (2006.01)
(52) U.S. Cl. .................. 372/29.02; 372/18; 372/20; 372/25; 372/29.011; 372/29.014
(58) Field of Classification Search .......... 372/18, 372/20, 25, 29.011, 29.014, 29.02
See application file for complete search history.

(56) References Cited

U.S. PATENT DOCUMENTS

| 7,143,769 | B2 | 12/2006 | Stoltz et al. | |
|---|---|---|---|---|
| 7,492,795 | B1* | 2/2009 | Delfyett et al. | 372/29.011 |
| 2004/0190907 | A1* | 9/2004 | Litvin | 398/149 |

OTHER PUBLICATIONS

P.J. Delfyett, S. Gee, M.T. Choi, H. Izadpanah, W. Lee, S. Oxharar, F. Quinlan, T. Yimaz, "Optical Frequency Combs From Semiconductor Lasers and Applications in Ultrawideband Signal Processing and Communications" J. Lightwave Technol., vol. 7, No. 7, pp. 2701-2719, Jul. 2006.
S. Gee, S. Ozharar, F. Quinlan, J.J. Plant, P.W. Juodawlkis, P.J. Delfyett, "Self Stabilization of an Actively Mode-Locked Semiconductor-based Fiber-ring Laser for Ultralow Jitter" IEEE Photon. Technol. Lett., vol. 19, No. 7, pp. 498-500, Apr. 1, 2007.
T. Yilmaz, C.M. Depriest, A. Braun, J. Abeles, P.J. Delfyett, "Noise in Fundamental and Harmonic Modelocked Semiconductor Lasers: Experiments and Simulations" J. Quantum Electon., vol. 39, No. 7, pp. 838-849, Jul. 2003.

(Continued)

*Primary Examiner*—Minsun Harvey
*Assistant Examiner*—Yuanda Zhang
(74) *Attorney, Agent, or Firm*—Brian S. Steinberger; Phyllis K. Wood; Law Offices of Brian S. Steinberger, P.A.

(57) ABSTRACT

Methods and devices for a coupled optoelectronic oscillator having optical frequency stabilization. The coupled optoelectronic oscillator includes a harmonically mode-locked laser cavity having a Mach-Zehnder modulator for mode-locking and an intracavity Fabry-Perot etalon to allow only one single supermode to lase, a stabilization loop coupled with the Fabry-Perot etalon to detect changes in the laser cavity optical frequency and generate an error signal to compensate for the frequency change to stabilize the mode-locking of the laser frequency stabilization, and an electrical loop between the laser cavity and the stabilization loop for driving the Mach-Zehnder modulator with the coupled optoelectronic oscillator signal.

9 Claims, 12 Drawing Sheets

OTHER PUBLICATIONS

N. Yu, E. Salik, L. Maleki, "Ultalow-noise Mode-Locked Laser with Coupled Optoelectronic Oscillator Configuration" Optics Letters., vol. 30, No. 10, pp. 1231-1233, May 15, 2005.

S. Gee, S. Ozharar, F. Quinlan, P.J. Delfyett, "High Precision Measurement of Free Spectral Range of Etalon" Electon. Lett., vol. 42, No. 12, pp. 715-716, Jun. 8, 2006.

J.M. Kahn, "Modulation and Detection Techniques for Optical Communication Systems" in Optical Amplifiers and Their Applications and Coherent Optical Technologies and Applications on CD-ROM (The Optical Society of America, Washington, DC, 2006), CThC1, 3 pages.

F. Quinlan, S. Gee, S. Ozharar, P.J. Delfyett, "Frequency Stabilized Low Timing Jitter Mode-Locked Laser with an Intracavity Etalon" in Conference on Lasers and Electro-Optics/Quantum Electronics and Laser Science Conference and Photonic Applications Systems Technologies 2007 Technical Digest )Optical Society of America, Washington, DC, 2007), CThHH6, 2 pages.

R.W. Drever, J.L. Hall, F.V. Kowalski, J. Hough, G.M. Ford, A.J. Munley, H. Ward, "Laser Phase and Frequency Stabilization Using an Optical Resonator" Appl. Phys. B vol. 31, pp. 97-105, 1983.

* cited by examiner

OPTICAL FREQUENCY SELF STABILIZATION IN A COUPLED OPTOELECTRONIC OSCILLATOR

This application claims the benefit of priority of U.S. Provisional Patent Application No. 60/900,533 filed on Feb. 9, 2007.

FIELD OF THE INVENTION

This invention relates to optoelectronic oscillator and, in particular, to methods, systems, apparatus and devices to provide optical frequency self stabilization in a coupled optoelectronic oscillator by incorporating a high finesse Fabry-Perot etalon for optical frequency stabilization and supermode suppression of an actively, harmonically mode-locked laser.

BACKGROUND AND PRIOR ART

Low noise, high repetition rate mode-locked lasers have a number of potential applications in signal processing and coherent communications as described in P. J. Delfyett, S. Gee, M. T. Choi, H. Izadpanah, W. Lee, S. Ozharar, F. Quinlan, T. Yimaz, "Optical frequency combs from semiconductor lasers and applications in ultrawideband signal processing and communications," J. Lightwave Technol., vol. 7, pp. 2701-2719, 2006. For applications such as the generation of arbitrary RF waveforms and photonic sampling, pulse-to-pulse timing and amplitude jitter are more important than optical frequency stability, and laser cavities can be designed that sacrifice optical stability in favor of increased timing stability as described in S. Gee, S. Ozharar, F. Quinlan, J. J. Plant, P. W. Juodawlkis, P. J. Delfyett, "Self stabilization of an actively mode-locked semiconductor-based fiber-ring laser for ultralow jitter," Photon. Technol. Lett., vol. 19. pp. 498-500. However, a number of applications such as optical code division multiple access (OCDMA) and optical arbitrary waveform synthesis require a set of phase locked frequencies with multigigahertz spacing and high stability.

A successful method to simultaneously achieve low timing and amplitude jitter as well as optical frequency stability is using an intracavity etalon in a harmonically mode-locked laser as described in F. Quinlan, S. Gee, S. Ozharar, P. J. Delfyett, "Frequency stabilized low timing jitter mode-locked laser with an intracavity etalon," in Conference on Lasers and Electro-Optics/Quantum Electronics and Laser Science Conference and Photonic Applications Systems Technologies 2007 Technical Digest (Optical Society of America, Washington, D.C., 2007), CThHH6. Harmonic mode-locking can be described in the frequency domain as a collection of interleaved optical supermodes. Each optical supermode consists of phase locked modes separated by the pulse repetition rate whereas different supermodes are separated by the inverse of the cavity round trip time as described in T. Yilmaz, C. M. Depriest, A. Braun, J. Abeles, P. J. Delfyett, "Noise in fundamental and harmonic modelocked semiconductor lasers: experiments and simulations," J. Quantum Electron., vol. 39, pp. 838-849, 2003.

Placing a high finesse etalon into the laser cavity with a free spectral range equal to the pulse repetition rate selects a single optical supermode that can then be used for frequency domain applications. Moreover, the optical frequencies can be stabilized via the Pound-Drever-Hall laser frequency stabilization method using the same intracavity etalon as described in F. Quinlan, supra, and in R. W. Dreyer, P. J. L. Hall, F. V. Kowalski, J. Hough, G. M. Ford, A. J. Munley, H. Ward, "Laser phase and frequency stabilization using an optical resonator," Appl. Phys. B. vol. 31, pp. 97-105, 1983. By selecting a single optical supermode, the intracavity etalon also suppresses the supermode noise spurs that contribute to the pulse-to-pulse timing and amplitude noise. Also, by using a long laser cavity and harmonic mode-locking, the linewidth of the individual optical modes can be reduced while a high pulse repetition rate is maintained. The narrow optical linewidths produced are advantageous for high spectral efficiency coherent communication modulation formats as described in J. M. Kahn, "Modulation and Detection Techniques for Optical Communication Systems," in Optical Amplifiers and Their Applications and Coherent Optical Technologies and Applications on CD-ROM (The Optical Society of America, Washington, D.C., 2006), CThC1, and the reduction of the spontaneous emission contribution to the timing jitter as described in T. Yilmaz, supra.

In addition to spontaneous emission, a major source of timing jitter in an actively mode-locked laser is the phase noise of the RF source used for mode-locking. A way to remove this source of timing jitter is to exploit the high Q of a mode-locked laser and convert it into a coupled optoelectronic oscillator as described in N. Yu, E. Salik, L. Maleki, "Ultralow-noise mode-locked laser with coupled optoelectronic oscillator configuration," Opt. Lett., vol. 30, pp. 1231-1233, 2005. However, in the conventional coupled optoelectronic oscillator, no effort is made to generate a stabilized optical frequency comb.

To solve the problems encountered with the prior art, combining the technique of incorporating a high finesse etalon in a harmonically mode-locked laser with the conventional coupled optoelectronic oscillator, a completely self contained optical frequency stabilized oscillator was built and characterized. With the incorporation of an etalon, a coupled optoelectronic oscillator can be utilized for a host of new applications relying on a stabilized optical frequency comb.

SUMMARY OF THE INVENTION

A primary objective of the invention is to provide apparatus, methods, systems and devices for combining the technique of incorporating a high finesse etalon in a harmonically mode-locked laser with the conventional coupled optoelectronic oscillator, a completely self contained optical frequency stabilized oscillator is achieved.

A secondary objective of the invention is to provide apparatus, methods, systems and devices for a coupled optoelectronic oscillator containing a high finesse Fabry-Perot etalon in the laser cavity wherein the optical filtering of the etalon suppresses all but a single optical supermode making this novel oscillator available for applications relying on a multigigahertz spaced optical frequency comb.

A third objective of the invention is to provide apparatus, methods, systems and devices for a coupled optoelectronic oscillator wherein an etalon is utilized for optical frequency stabilization with the Pound-Drever-Hall method.

A fourth objective of the invention is to provide apparatus, methods, systems and devices for a coupled optoelectronic oscillator that produces a coupled optoelectronic oscillator signal that is used to generate the error Pound-Drever-Hall error signal by frequency dividing to an appropriate frequency. Using the frequency divided coupled optoelectronic oscillator signal allows for the oscillator to be optical frequency stabilized while remaining completely self contained.

A fifth objective of the invention is to provide apparatus, methods, systems and devices for a coupled optoelectronic oscillator incorporating a Fabry-Perot etalon for frequency stabilization, wherein that the inclusion of the etalon makes RF bandpass filter in a conventional coupled optoelectronic oscillator unnecessary and the removal of the RF bandpass filter increased the stability of the coupled optoelectronic oscillator signal by more than an order of magnitude.

A first preferred embodiment of the invention provides a coupled optoelectronic oscillator having optical frequency stabilization. The coupled optoelectronic oscillator includes a harmonically mode-locked laser cavity having a Mach-Zehnder modulator for mode-locking and an intracavity Fabry-Perot etalon to allow only one single supermode to lase, a stabilization loop coupled with the Fabry-Perot etalon to detect changes in the laser cavity optical frequency and generate an error signal to compensate for the frequency change to stabilize the mode-locking of the laser frequency stabilization, and an electrical loop between the laser cavity and the stabilization loop for driving the Mach-Zehnder modulator with the coupled optoelectronic oscillator signal. In a preferred embodiment, the Fabry-Perot etalon is a high finesse, approximately 100, air gap etalon having low thermal expansion coefficient spacers included in the laser cavity and the stabilization loop is a Pound-Drever-Hall stabilization loop. The electrical loop includes a detector for detecting a portion of the coupled optoelectronic oscillator output, an amplifier for receiving and amplifying the detected portion of the coupled optoelectronic oscillator output and a signal divider for dividing down the amplified coupled optoelectronic oscillator signal for driving the stabilization loop to allow that coupled optoelectronic oscillator to produce a frequency stabilized optical output making a RF bandpass filter in the electrical loop unnecessary.

The second embodiment provides a method for generating a self stabilized optical frequency output from a coupled optoelectronic oscillator including the steps of generating a frequency stabilized optical output from a laser cavity having one single intracavity Fabry-Perot etalon, coupling a stabilization loop with the intracavity etalon, generating an error signal in the stabilization loop for stabilizing a frequency of the laser cavity optical output and generating a drive signal from the frequency stabilized optical output to drive the stabilization loop to generate the self stabilized optical frequency output from the coupled optoelectronic oscillator.

The step of generating a frequency stabilized optical output includes using a high finesse Fabry-Perot etalon to allow only one single phase locked mode group to lase and including a low thermal expansion coefficient spacer in the laser cavity with the Fabry-Perot etalon. The generating the frequency stabilized output further includes setting a free spectral range of the Fabry-Perot etalon approximately equal to a desired pulse repetition rate and determining a number of and length of the low thermal expansion coefficient spacers included in the laser cavity with the Fabry-Perot etalon.

Generating the drive signal includes the steps of detecting a portion of the optical output of the laser cavity, amplifying the detected portion of the optical output, dividing the amplified optical output to produce the drive signal, and driving the stabilization loop with the drive signal to stabilize the frequency of the optical output.

The step of generating an error signal includes the steps of using the etalon to detect a change in the optical frequency of the coupled optoelectronic oscillator, generating an error signal from detected optical frequency change, conditioning the generated error signal by a proportional gain-integration-differentiation controller and feeding the conditioned error signal into a piezoelectric actuator to compensate for the detected change in optical frequency to achieve supermode suppression and optical frequency stabilization from the coupled optoelectronic oscillator with only one single intracavity etalon.

Further objects and advantages of this invention will be apparent from the following detailed description of preferred embodiments which are illustrated schematically in the accompanying drawings.

DESCRIPTION OF THE PREFERRED EMBODIMENTS

Figure 1:
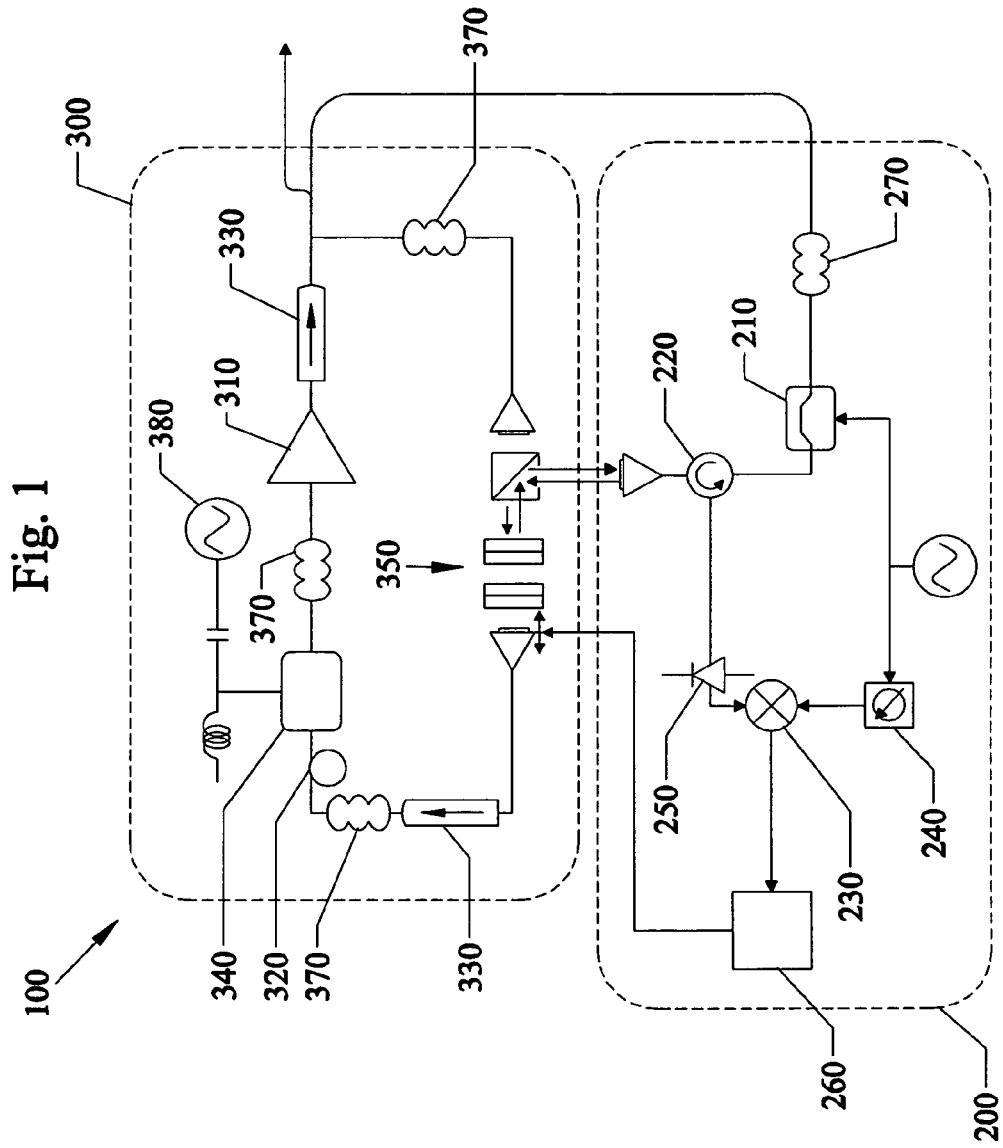
FIG. 1 is a schematic diagram of an actively mode-locked laser with laser frequency stabilization through Pound-Drever-Hall.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the detailed specification to identify components:

| | |
|---|---|
| 100 | mode-locked laser |
| 300 | laser cavity |
| 310 | semiconductor optical amplifier |
| 320 | dispersion compensating fiber |
| 330 | isolator |
| 340 | an intensity modulator |
| 350 | Fabry-Perot etalon |
| 370 | polarization controllers |
| 380 | Mach-Zehnder style modulator |
| 200 | PDH Stabilization Loop |
| 210 | phase modulator |
| 220 | optical circulator |
| 230 | double balanced mixer |
| 240 | phase shifter |
| 250 | photodetector |
| 260 | PID controller |
| 270 | polarization controller |
| 500 | coupled optoelectronic oscillator |
| 510 | photodetector |
| 520 | amplifier |
| 550 | electrical feedback loop |

The method, system, apparatus and device of the present invention provide a harmonically mode-locked, semiconductor gain-based laser 100 with an intracavity etalon as shown in FIG. 1 which is a schematic diagram of an actively mode-locked laser 100 with laser frequency stabilization through Pound-Drever-Hall stabilization loop 200. The mode-locked laser 300 includes a semiconductor optical amplifier 310; a dispersion compensating fiber 320; an isolator 330; an intensity modulator 340; a Fabry-Perot etalon 350 (also referred to as FPE); polarization controllers 370 and 270; a phase modulator 210; optical circulator 220; a double balanced mixer 230; phase shifter 240; photodetector 250; and a PID controller 260. The arrows indicate feedback loop beam path in free space.

The cavity fundamental frequency is approximately 34 MHz corresponding to a cavity length of approximately 5.9 m. A dispersion compensating fiber section 320 of approximately 43 cm is included to reduce the cavity dispersion. Mode-locking is achieved via loss modulation using a Mach-Zehnder style modulator 380 at 10.24 GHz. This frequency corresponds approximately to the 300th harmonic of the laser cavity 300 fundamental frequency. A high finesse, approximately 100, air gap Fabry-Perot etalon 350 with three low thermal expansion coefficient spacers is also included in the laser cavity 300. The etalon's 350 free spectral range is set equal to the desired pulse repetition rate by making a high precision measurement of the free spectral range as described in S. Gee, S. Ozharar, F. Quinlan, P. J. Delfyett, "High precision measurement of free spectral range of etalon," Electron. Lett., vol. 42, pp. 715-716, 2006, and the length of the etalon spacers were adjusted accordingly. In the example shown in FIG. 1, the final free spectral range of the etalon of approximately 10.2401±approximately 0.0002 GHz matches with the target free spectral range of approximately 10.240 GHz.

The purpose of the etalon 350 is twofold. First, the inclusion of the etalon allows only a single phase locked mode group, or supermode, to lase. Without the inclusion of the etalon 350, approximately 300 interleaved supermodes compete, and the resulting random fluctuations in amplitude and phase disturb the output pulse train. This noise manifests itself in the timing and amplitude noise spectra as a series of noise spurs, called supermode noise, at multiples of the cavity fundamental frequency, approximately 34 MHz in this example. Also, the simultaneous lasing of different optical supermodes precludes the use of a single phase locked frequency comb with multi gigahertz spacing. In the frequency domain, the FPE is considered as a periodic bandpass filter that selects a single optical supermode. Without stabilization of the laser cavity, environmental influences cause the optical frequencies to drift relative to the transmission peaks of the FPE and these frequency fluctuations destabilize the mode-locking. The modes of the laser cavity are therefore stabilized to the FPE with the Pound-Drever-Hall (PDH) laser frequency stabilization method described in R. W. Dreyer, P. J. L. Hall, F. V. Kowalski, J. Hough, G. M. Ford, A. J. Munley, H. Ward, "Laser phase and frequency stabilization using an optical resonator," Appl. Phys. B. vol. 31, pp. 97-105, 1983.

The PDH stabilization loop 200 uses the FPE 350 to detect small changes in the optical frequencies of the laser to create an error signal that, after conditioning by a proportional gain-integration-differentiation (PID) controller 260, is fed back into a piezoelectric actuator to compensate for the frequency change. A second RF signal at a frequency much lower than the mode-locking rate is required to create the Pound-Drever-Hall error signal. Thus supermode suppression and optical frequency stabilization are achieved simultaneously with a single intracavity Fabry-Perot etalon 350.

Figures 2A, 2B:
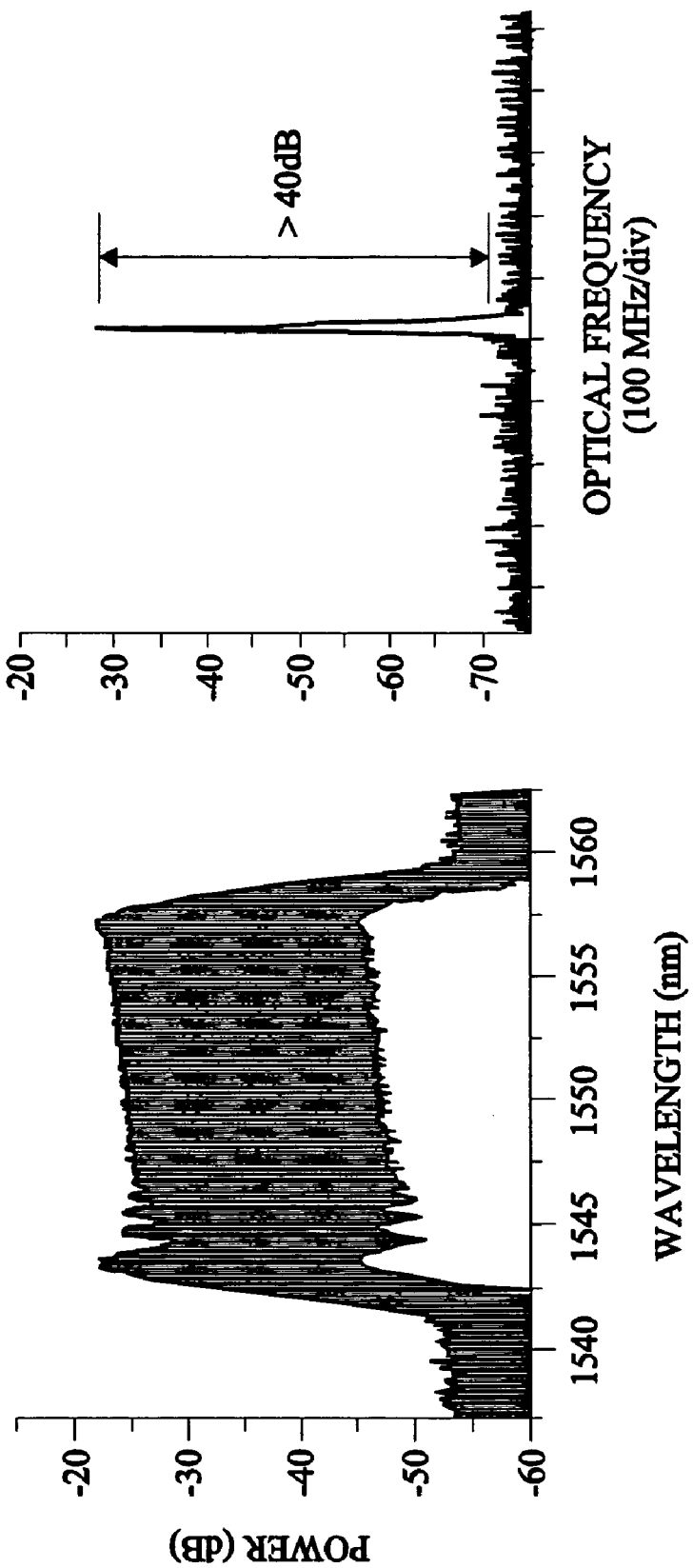
FIG. 2a is a graph showing an optical spectrum when the laser is actively mode-locked at approximately 10.24 GHz with a spectrum that spans approximately 16 nm in an approximately −10 dB bandwidth.
FIG. 2b is a graph showing an actively mode-locked laser optical spectrum with a high resolution optical spectrum of a single mode demonstrating greater than approximately 40 dB sidemode suppression.

The optical spectrum when the laser is actively mode-locked at approximately 10.24 GHz is shown in FIG. 2a. The spectrum spans approximately 16 nm in an approximately −10 dB bandwidth, corresponding to approximately 2 THz. The visibility of the approximately 10.24 GHz spaced comb lines is resolution limited and indicates the suppression of all but one optical supermode. The dominance of a single optical supermode is confirmed with a high resolution spectrum of one of the comb lines, shown in FIG. 2b. Other optical modes, spaced by the cavity fundamental frequency of approximately 34 MHz, are suppressed below the measurement noise floor.

Figure 3B:
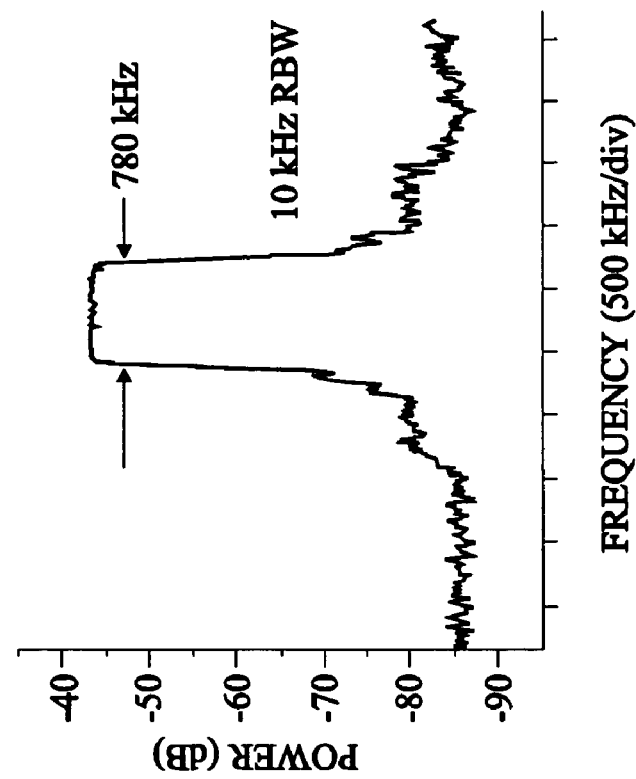
FIG. 3b is a graph showing an actively mode-locked laser frequency stability measurements in the RF domain.
Figure 3A:
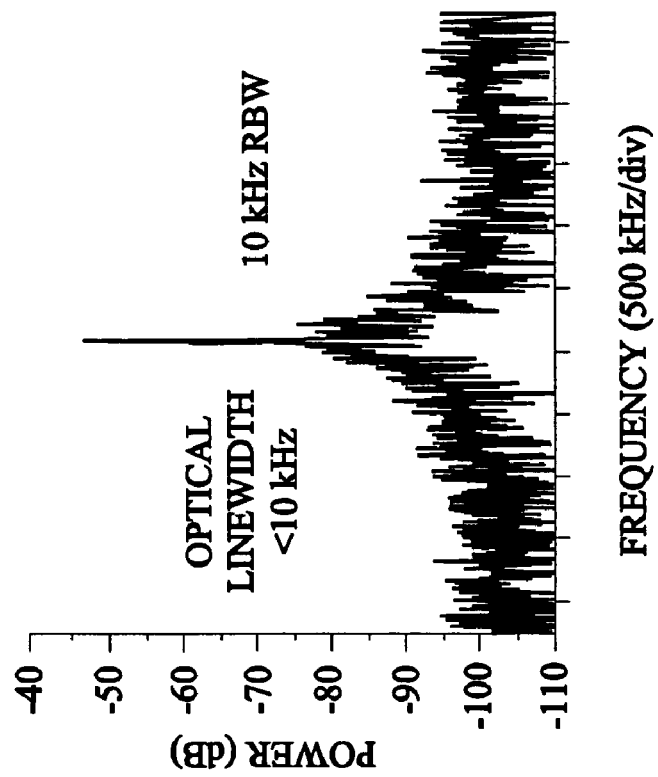
FIG. 3a is a graph showing an actively mode-locked laser linewidth in the RF domain.

A measurement of the optical frequency stability of the mode-locked laser 100 was performed by measuring the stability of a photodetected beat tone between a mode of the mode-locked laser and a stable, narrow line width continuous-wave (CW) laser. The narrow line width of the CW laser, less than approximately 1 kHz, allows an estimation of the linewidth of the optical frequencies of the mode-locked laser 100. The results are shown in FIG. 3. In FIG. 3a, the width of the beat tone is limited by the resolution of the measurement of 10 kHz. As shown in FIG. 3b, a maximum hold on the RF spectrum analyzer shows a maximum deviation in approximately 30 seconds to be only approximately 780 kHz.

Figure 4B:
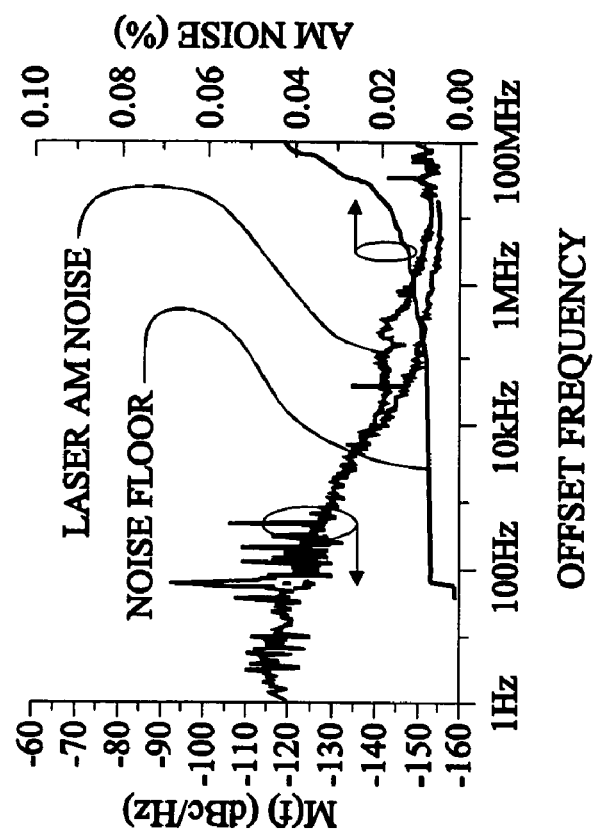
FIG. 4b shows the pulse-to-pulse amplitude noise time domain characteristics of the mode-locked laser.
Figure 4A:
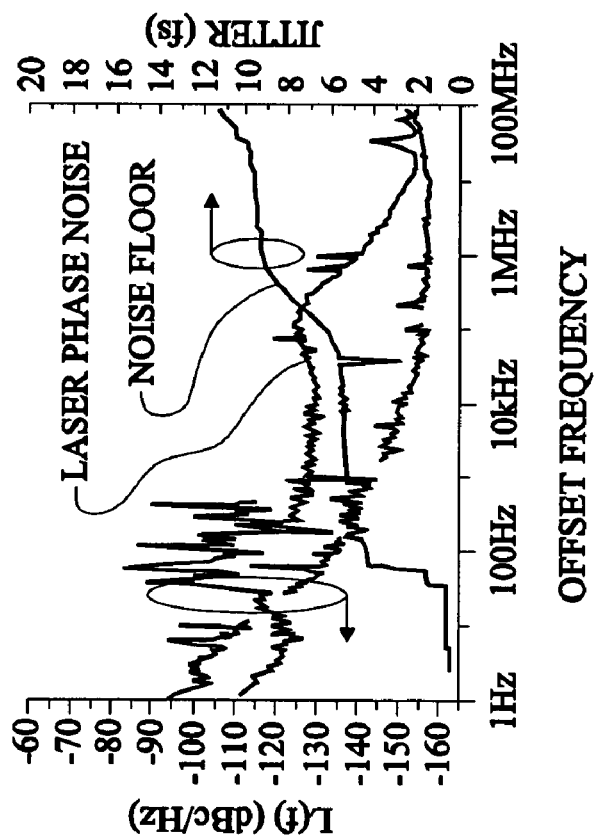
FIG. 4a shows the pulse-to-pulse timing jitter time domain characteristics of the mode-locked laser.
Figure 4D:
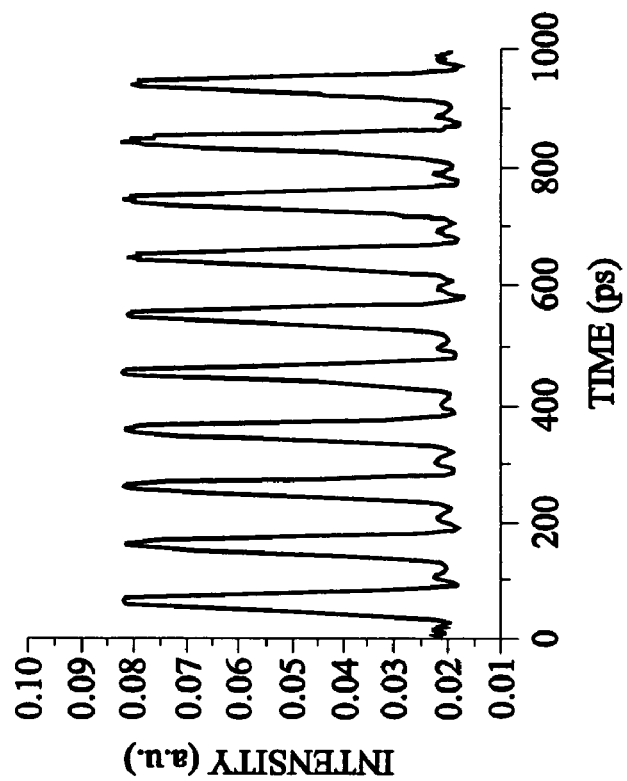
FIG. 4d shows the pulse autocorrelation time domain characteristics of the mode-locked laser.
Figure 4C:
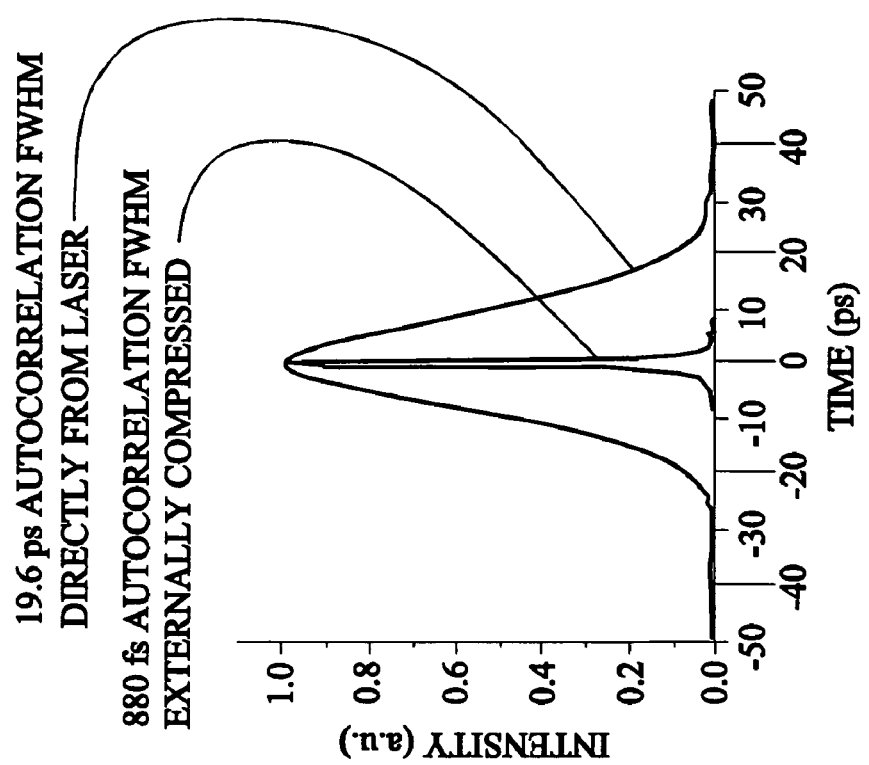
FIG. 4c shows the sampling scope trace time domain characteristics of the mode-locked laser.

The time domain characteristics of the mode-locked laser 100 are shown in FIGS. 4a-4d. FIG. 4a shows the pulse-to-pulse timing jitter, FIG. 4b shows the pulse-to-pulse amplitude noise, FIG. 4c shows the sampling scope trace and FIG. 4d shows the pulse autocorrelation. The timing jitter and amplitude noise are approximately 11.4 fs and approximately 0.04%, respectively, over the measurement band within a range of approximately 1 Hz to approximately 100 MHz. The high suppression of the supermode noise spurs in the phase noise power spectrum, the first to a level of approximately −143 dBc/Hz, and the second below approximately −150 dBc/Hz. The supermode noise spurs are similarly suppressed in the amplitude noise. By extrapolating to the Nyquist frequency, the total rms jitter from approximately 1 Hz to approximately 5.12 GHz is estimated to be approximately 31 fs. The pulse autocorrelation is shown in FIG. 4c. As shown, the pulses generated by the mode-locked laser 500 have a large linear chirp. The output pulses are externally compressed with a dual grating pulse compressor with an autocorrelation FWHM of approximately 880 fs. A sampling scope trace of the pulse train is shown in FIG. 4d.

Figure 5:
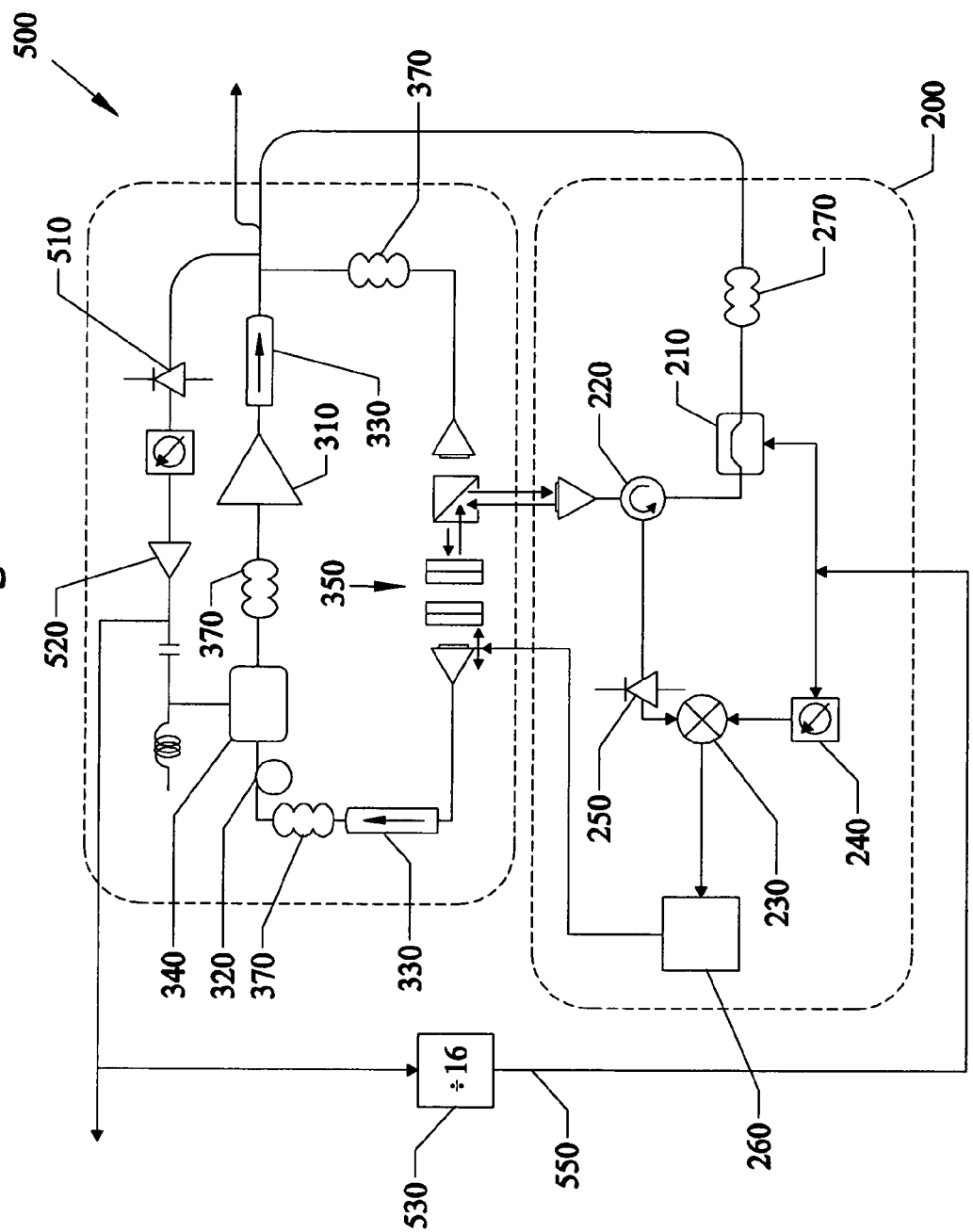
FIG. 5 is a schematic diagram of an optical frequency stabilized coupled optoelectronic oscillator with the PDH loop driven by the frequency divided COEO signal and a low noise amplifier.

FIG. 5 is a schematic diagram of a coupled optoelectronic oscillator 500 constructed using the harmonically mode-locked laser 100 described above. To convert the laser 100 to a coupled optoelectronic oscillator 500 (also referred to as COEO), part of the laser output was photo detected by photo detector 510, amplified by amplifier 520, and used to drive the Mach-Zehnder modulator to form the electrical feedback loop 550. The inclusion of the FPE 350 in the laser cavity makes this coupled optoelectronic oscillator 500 significantly different from a conventional COEO.

First, a 10.24 GHz spaced optical comb with a high optical signal to noise ratio (OSNR) is produced just as in the actively mode-locked laser. These optical frequencies are still stabilized via the PDH method in the PDH stabilization loop 200, however a separate RF source is not used. Instead, the 10.24 GHz COEO signal is frequency divided down to 640 MHz and then used to drive the PDH feedback loop. Using the frequency divided COEO signal allows the oscillator to produce a frequency stabilized approximately 10.24 GHz spaced comb while remaining completely self-contained.

Figure 6B:
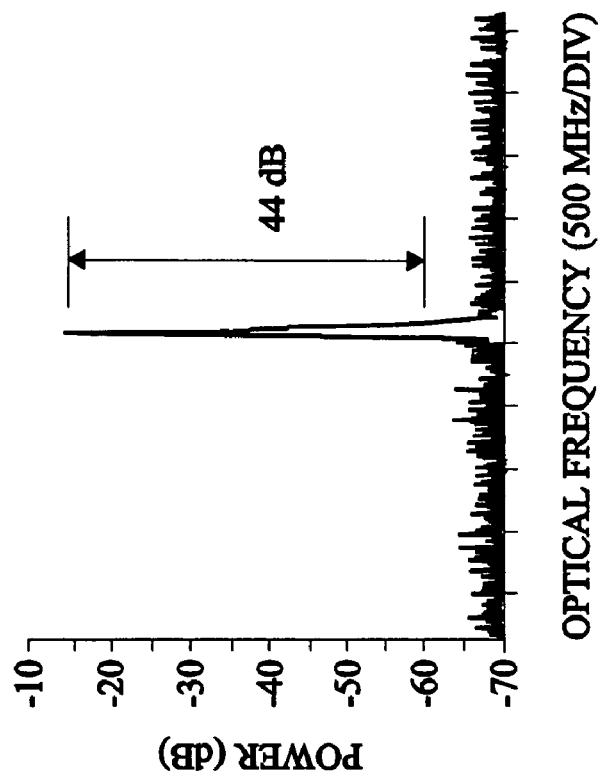
FIG. 6b is a graph showing the optical frequency stabilized COEO high resolution optical spectrum of a single mode demonstrating approximately 44 dB sidemode suppression.
Figure 6A:
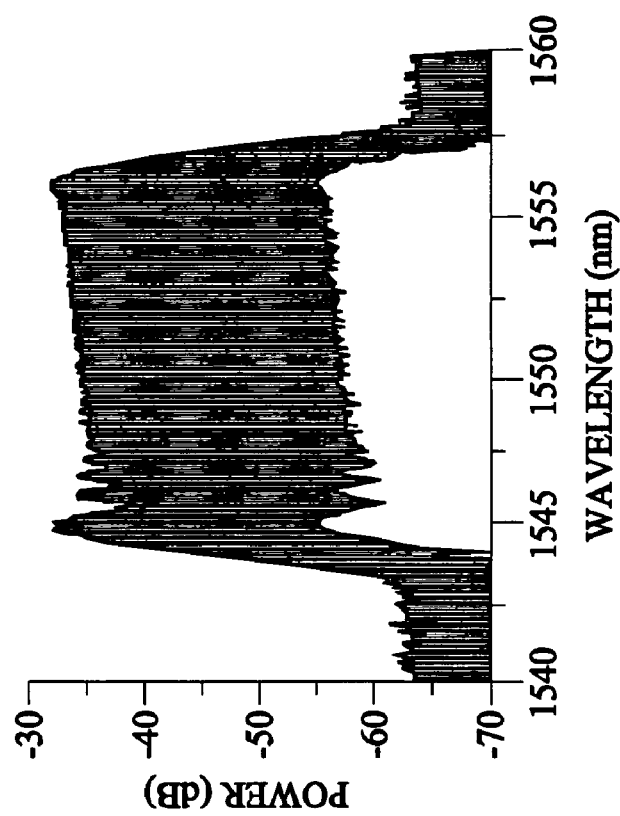
FIG. 6a is a graph showing the optical frequency stabilized COEO optical full spectrum with an approximately 13 nm-10 dB width.
Figure 7B:
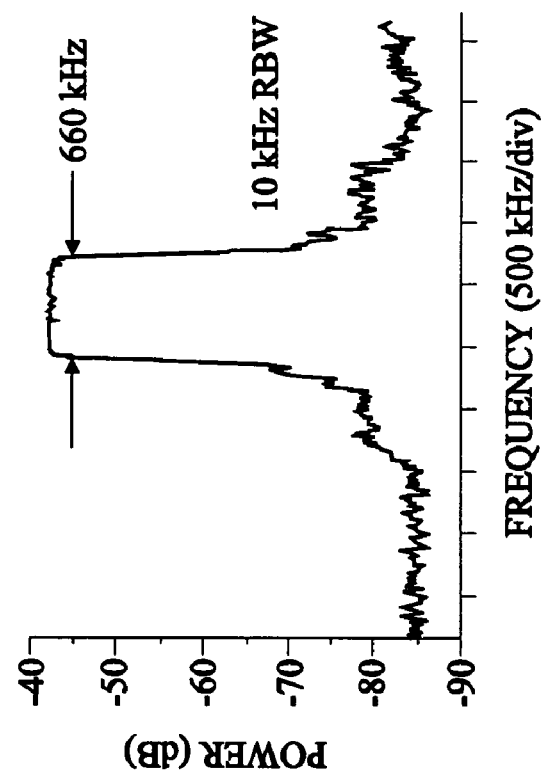
FIG. 7b is a graph showing an optical frequency stabilized COEO frequency stability measurements in the RF domain.
Figure 7A:
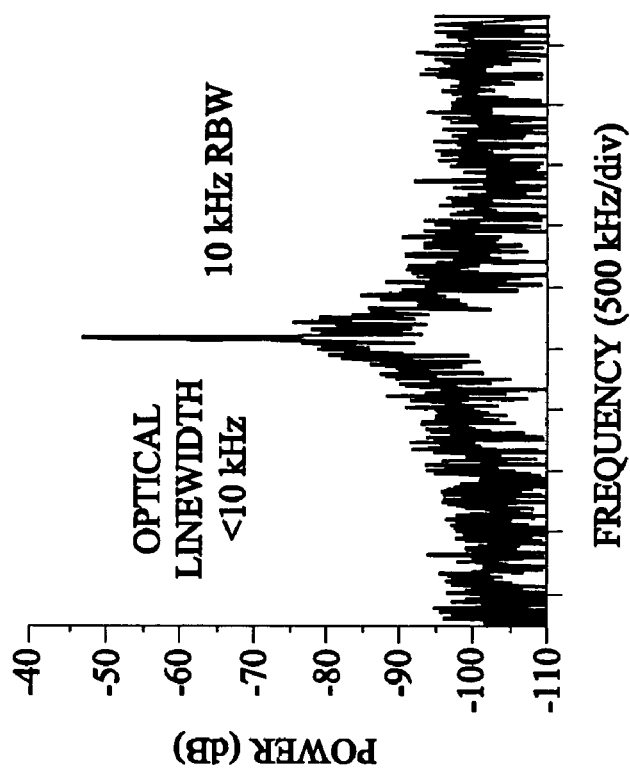
FIG. 7a is a graph showing an optical frequency stabilized COEO linewidth.

The optical spectrum of the coupled optoelectronic oscillator is shown in FIGS. 6a and 6b. The full spectrum with a −10 dB width of 13 nm is shown in FIG. 6a while the high OSNR of a single mode is shown in FIG. 6b. Comparing FIGS. 6a and 6b to FIGS. 2a and 2b shows that the quality of the optical spectrum is maintained when the actively mode-locked laser 100 was converted to a coupled optoelectronic oscillator 500. Furthermore, optical frequency stability was measured using the same technique as described above for the actively mode-locked laser. The result is shown in FIGS. 7a and 7b. The linewidth and optical frequency stability is maintained, demonstrating the ability of the coupled optoelectronic oscillator to self-stabilize the approximately 10.24 GHz-spaced optical frequency comb.

Another important difference between the coupled optoelectronic oscillator of the present invention and the conventional coupled optoelectronic oscillator is that the inclusion of the etalon obviates the need for an RF bandpass filter in the electrical feedback loop. In a conventional coupled optoelectronic oscillator, a multiplicity of frequencies are available as possible oscillation frequencies of the coupled optoelectronic oscillator. These frequencies correspond to multiples of the laser cavity fundamental frequency, and one of these modes is selected for oscillation by including a high quality factor RF bandpass filter in the electrical feedback loop. By placing a FPE 350 inside the laser cavity 300, the undesired modes are suppressed in the optical domain making the RF bandpass filter unnecessary.

The removal of the RF filter can be advantageous because the RF filter is susceptible to environmental fluctuations. The change in the delay due to environmental changes for a 10.24 GHz signal through a bandpass filter was measured using the circuit configuration shown in FIG. 8a. The tested filter had an approximately −10 dB bandwidth of approximately 27 MHz centered at approximately 10.24 GHz. A low noise 10.24 GHz signal was split with half the power going through the filter to the RF port of a double balance mixer and half the power going through a phase shifter to the LO port of the mixer. The two signals on the mixer were set to phase quadrature by the phase shifter to create a phase to voltage converter. By monitoring the DC voltage level after the mixer, the relative phase shift between the two inputs to the mixer was measured.

Figure 8B:
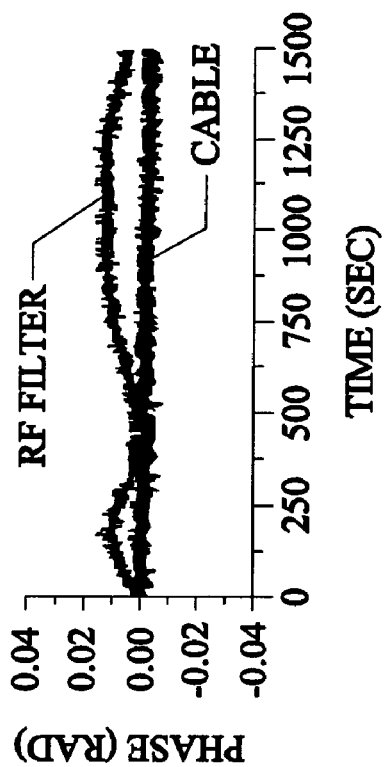
FIG. 8b is a graph showing the results of the circuit diagram of FIG. 8a showing the susceptibility of the RF filter to environmental influences.
Figure 8A:
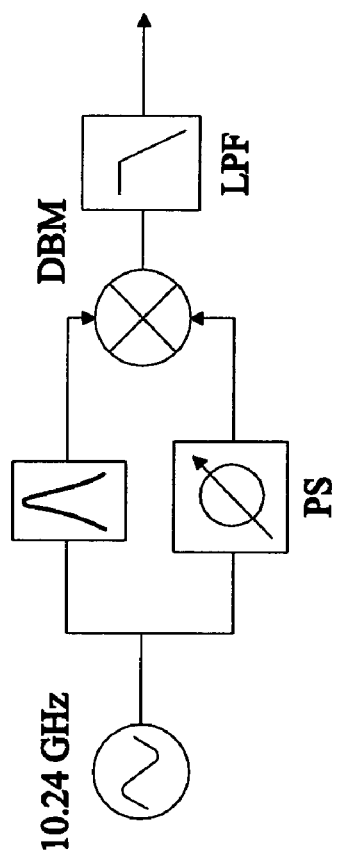
FIG. 8a is a schematic block diagram of a phase to voltage converter circuit configuration.
Figure 9B:
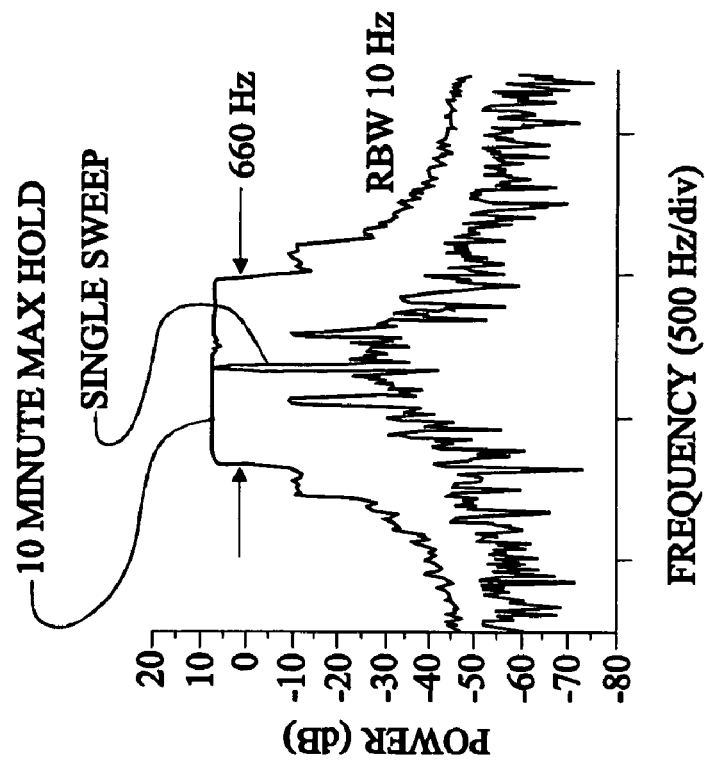
FIG. 9b is a graph showing stability of the 10.24 GHz output of the coupled optoelectrical oscillator when the RF filter is removed.
Figure 9A:
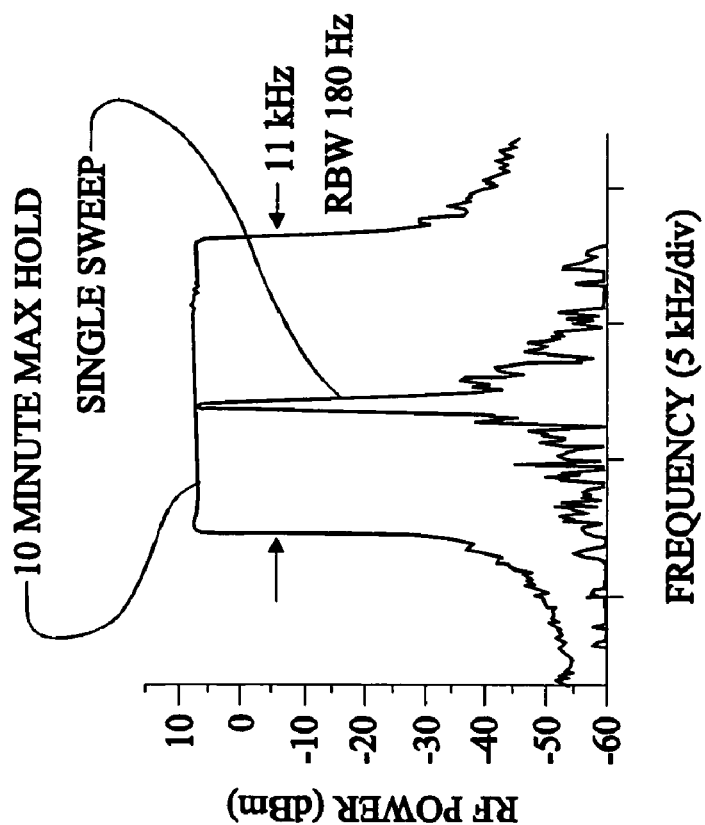
FIG. 9a is a graph showing stability of the 10.24 GHz output of the coupled optoelectrical oscillator when an RF filter for mode selection is included in the electrical feedback loop.

The results are shown in FIG. 8b which also shows the result of the same measurement when the filter is replaced by a short length of cable. When the RF filter is placed in the electrical feedback loop of a coupled optoelectronic oscillator, these changes in the accumulated phase translate into frequency fluctuations of the COEO signal. The direct effect of the RF bandpass filter stability on the COEO frequency stability is shown in FIGS. 9a and 9b. When the bandpass filter is placed in the electrical feedback loop 550 directly after the low noise amplifier 520, the maximum frequency deviation of the COEO signal is more than an order of magnitude greater than when there is no filter in the feedback loop. The maximum frequency deviation of the COEO signal when the RF filter is removed corresponds to approximately 0.06 ppm.

Figure 10B:
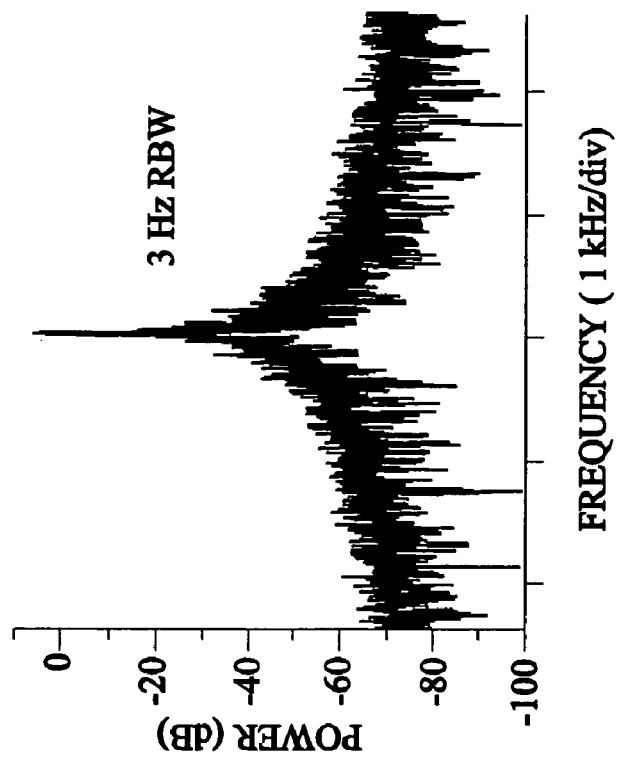
FIG. 10b is a graph showing 5 kHz span measurement showing a well defined coupled optoelectronic oscillator frequency.
Figure 10A:
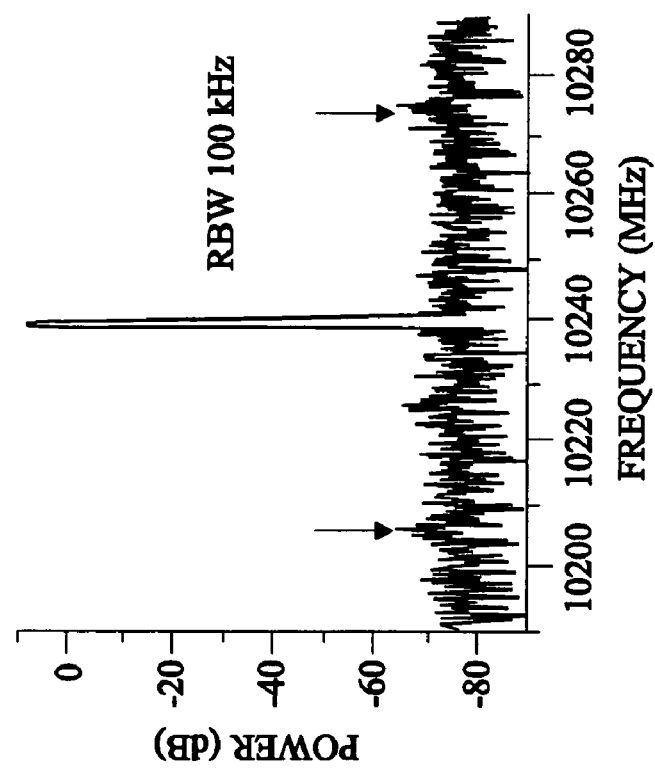
FIG. 10a is a graph showing an RF spectra of the coupled optoelectronic oscillator output with an approximately 100 MHz span measurement, the arrows indicate the location of the supermode noise spurs.

Additional RF spectra were measured to determine the purity of the COEO signal and the suppression of the supermode noise spurs. The level of suppression of the supermode noise spurs of the RF output of the COEO is shown in FIG. 10a. The spurs are barely visible above the noise floor, corresponding to noise level better than approximately −130 dBc/Hz. This level of supermode suppression is the same as the directly measured photodetected spectrum of the actively mode-locked laser (not shown). An approximately 5 kHz span measurement of this signal, shown in FIG. 10b, shows the well defined COEO frequency for this oscillator.

Figure 11:
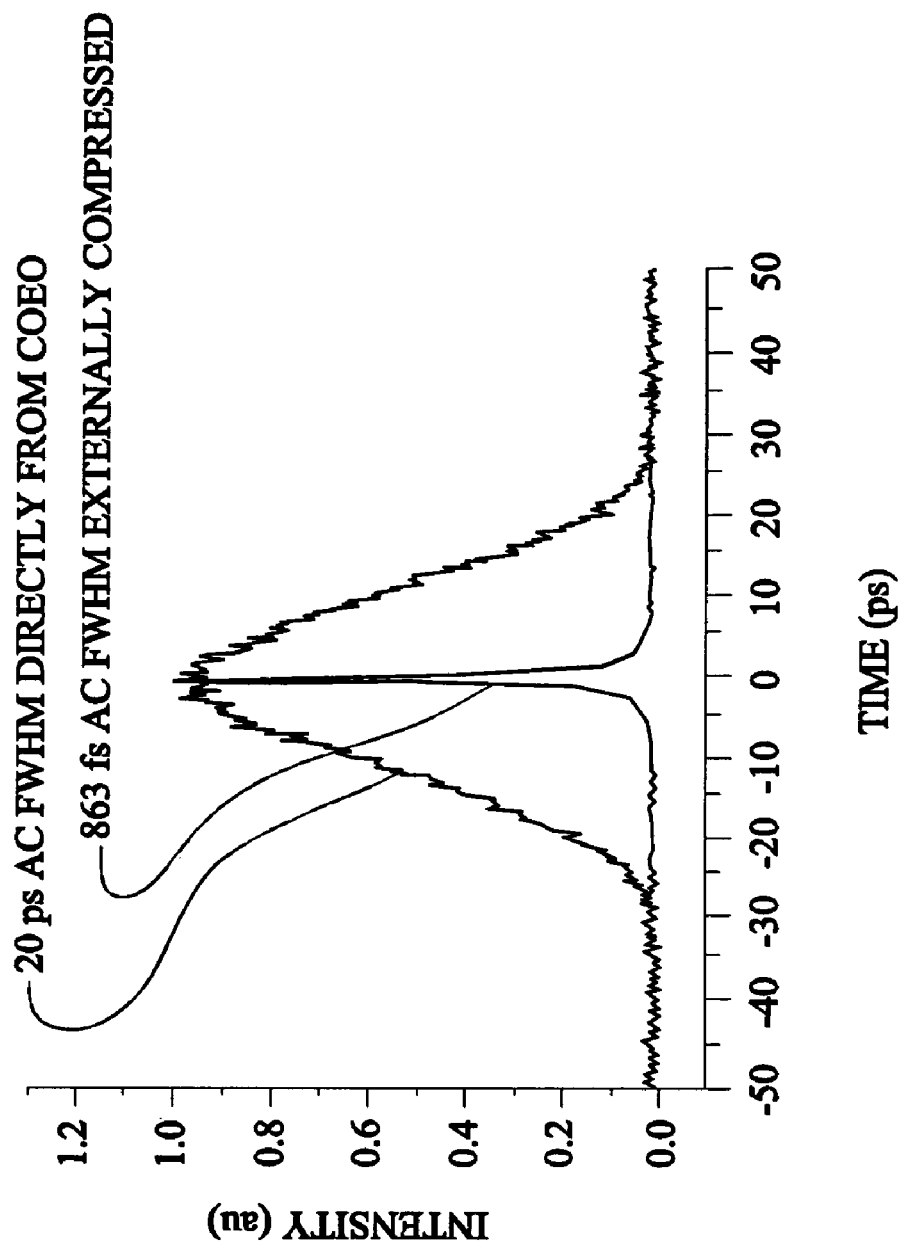
FIG. 11 is a graph showing the pulse autocorrelation for the optical frequency stabilized coupled optoelectronic oscillator.

Finally, the pulse autocorrelation was measured for the coupled optoelectronic oscillator. Again, the output pulse has a large linear chirp and can be compressed to less than approximately 1 pico second as shown in FIG. 11.

In summary, a coupled optoelectronic oscillator containing a high finesse Fabry-Perot etalon 350 in the laser cavity 300 has been described. The inclusion of the etalon 350 makes the coupled optoelectronic oscillator of the present invention distinct from the conventional prior art COEO. First, the optical filtering of the etalon suppresses all but one single optical supermode making this oscillator available for applications relying on a multigigahertz spaced optical frequency comb. Second, the etalon is utilized for optical frequency stabilization with the Pound-Drever-Hall method. The signal used to generate the error PDH error signal is derived from the COEO signal by frequency dividing to an appropriate frequency, 640 MHz in the example shown in FIG. 5. Using the frequency divided COEO signal allows for the oscillator to be optical frequency stabilized while remaining completely self contained. Also, the inclusion of the etalon eliminates the need for the RF bandpass filter in a conventional COEO and removal of the RF bandpass filter increased the stability of the COEO signal by more than an order of magnitude.

The performance of the optical frequency self stabilized COEO depends heavily on the performance of the Fabry-Perot etalon. Increasing the finesse of the etalon improves the stability of the optical modes by increasing the discriminant of the PDH error signal, but it also allows for a longer optical cavity, thereby increasing the effective microwave quality factor of the mode-locked laser.

While the coupled optoelectronic oscillator is shown and described with a free spectral range of the etalon of approximately 10.24 GHz spaced optical comb for a laser cavity fundamental frequency of approximately 34 MHz, alternative harmonic frequencies of the fundamental frequency may be substituted without deviating from the scope of the present invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A coupled optoelectronic oscillator having optical frequency stabilization comprising: a harmonically mode-locked laser cavity having a Mach-Zehnder modulator for mode-locking and one single intracavity Fabry-Perot etalon to allow only one single supermode to lase, generating a coupled optoelectronic oscillator signal; a stabilization loop coupled with the one single intracavity Fabry-Perot etalon to detect changes in the laser cavity optical frequency and generate an error signal, conditioning the error signal by a proportional gain-integration-differentiation controller and feeding the conditioned error signal to a piezoelectric actuator to compensate for the detected frequency change in the optical frequency to achieve supermode suppression and stabilize the mode-locking of the laser frequency stabilization with the one single intracavity Fabry-Perot etalon; and an electrical loop between the laser cavity and the stabilization loop for driving the Mach-Zehnder modulator with the coupled optoelectronic oscillator signal for the coupled optoelectronic oscillator to be optical frequency stabilized while remaining self contained.

2. The coupled optoelectronic oscillator of claim 1, wherein the Fabry-Perot etalon comprises:
a high finesse, approximately 100, air gap etalon having three low thermal expansion coefficient spacers included in the laser cavity.

3. The coupled optoelectronic oscillator of claim 1, wherein the stabilization loop comprises:
a Pound-Drever-Hall stabilization loop.

4. The coupled optoelectronic oscillator of claim 1, wherein the electrical loop further comprises:
a detector for detecting a portion of the coupled optoelectronic oscillator output;
an amplifier for receiving and amplifying the detected portion of the coupled optoelectronic oscillator output;
a signal divider for dividing down the amplified coupled optoelectronic oscillator signal for driving the stabilization loop to allow that coupled optoelectronic oscillator to produce a frequency stabilized optical output making a RF bandpass filter in the electrical loop unnecessary.

5. A method for generating a self stabilized optical frequency output from a coupled optoelectronic oscillator comprising the steps of:
generating a frequency stabilized optical output from a laser cavity having one single intracavity Fabry-Perot etalon;
coupling a stabilization loop with the intracavity etalon;
generating an error signal in the stabilization loop for stabilizing a frequency of the laser cavity optical output, comprising the steps of:
using the etalon to detect a change in the optical frequency of the coupled optoelectronic oscillator;
generating an error signal from detected optical frequency change; and
conditioning the generated error signal by a proportional gain-integration-differentiation controller; and
feeding the conditioned error signal into a piezoelectric actuator to compensate for the detected change in optical frequency to achieve supermode suppression and optical frequency stabilization from the coupled optoelectronic oscillator with only one single intracavity etalon; and
generating a drive signal from the frequency stabilized optical output to drive the stabilization loop to generate the self stabilized optical frequency output from the coupled optoelectronic oscillator.

6. The method of claim 5, wherein the step of generating a frequency stabilized optical output comprising the steps of:
using a high finesse Fabry-Perot etalon to allow only one single phase locked mode group to lase; and
including a low thermal expansion coefficient spacer in the laser cavity with the Fabry-Perot etalon.

7. The method of claim 6, further comprising the step of:
setting a free spectral range of the Fabry-Perot etalon approximately equal to a desired pulse repetition rate; and
determining a number of and length of the low thermal expansion coefficient spacers included in the laser cavity with the Fabry-Perot etalon.

8. The method of claim 5, wherein the step of generating a drive signal comprises the steps of:
detecting a portion of the optical output of the laser cavity;
amplifying the detected portion of the optical output;
dividing the amplified optical output to produce the drive signal; and
driving the stabilization loop with the drive signal to stabilize the frequency of the optical output.

9. The method of claim 5, further comprising the step of:
using the coupled optoelectronic oscillator containing the Fabry-Perot etalon in the laser cavity for optical filtering to suppresses all but one single optical supermode for applications relying on a multigigahertz spaced optical frequency comb.

* * * * *